(12) United States Patent
Adams et al.

(10) Patent No.: US 7,842,425 B2
(45) Date of Patent: Nov. 30, 2010

(54) ELECTRICAL INTERCONNECT FOR A FUEL CELL STACK

(75) Inventors: William A. Adams, Kemptville (CA); Christopher L. Gardner, Dunrobin (CA); James Donaldson Blair, Vancouver (CA)

(73) Assignee: Estco Battery Management Inc., Ottawa, Ontario (CA)

( * ) Notice: Subject to any disclaimer, the term of this patent is extended or adjusted under 35 U.S.C. 154(b) by 1136 days.

(21) Appl. No.: 10/968,287

(22) Filed: Oct. 20, 2004

(65) Prior Publication Data

US 2005/0106443 A1    May 19, 2005

Related U.S. Application Data

(60) Provisional application No. 60/512,782, filed on Oct. 21, 2003.

(51) Int. Cl.
*H01M 8/00* (2006.01)
*H01M 8/04* (2006.01)
*H01M 8/06* (2006.01)

(52) U.S. Cl. .................. 429/408; 429/400; 429/428

(58) Field of Classification Search ............... None
See application file for complete search history.

(56) References Cited

U.S. PATENT DOCUMENTS

| | | | |
|---|---|---|---|
| 4,810,595 A * | 3/1989 | Kahara et al. ............... 429/16 |
| 4,826,741 A * | 5/1989 | Aldhart et al. ............... 429/19 |
| 5,200,278 A | 4/1993 | Watkins et al. | |
| 6,280,868 B1 | 8/2001 | Badwal et al. | |
| 6,339,313 B1 * | 1/2002 | Adams et al. ............... 320/121 |
| 6,541,941 B2 | 4/2003 | Adams et al. | |
| 6,703,155 B2 * | 3/2004 | Scartozzi ..................... 429/32 |
| 2002/0142209 A1 | 10/2002 | Kikuchi et al. | |

FOREIGN PATENT DOCUMENTS

WO    WO 03/026072    3/2003
WO    WO 03/083975    10/2003

* cited by examiner

*Primary Examiner*—Dah-Wei D Yuan
*Assistant Examiner*—Steven Scully
(74) *Attorney, Agent, or Firm*—Leslie A. Kinsman; Borden Ladner Gervais LLP (57) ABSTRACT

A fuel cell arrangement including a plurality of fuel cells, each fuel cell including an electrolyte membrane disposed between an anode and a cathode, first and second flow field plates adjacent the anode and cathode, respectively; a fuel cell health management (FCHM) device; a plurality of plate members interposed between each of the fuel cells and being made of an electrically conductive metallic material and disposed between the first and second flow field plates of adjacent fuel cells to connect the fuel cells in series, and having an electrically conductive tab. The tab of each of the plate members being electrically connected to the FCHM to conduct current provided by the FCHM to provide a substantially uniform voltage over each electrically of the plate members to rejuvenate each fuel cell, to monitor each fuel cell, and to control each fuel cell, and having a heat sink for dissipating heat.

12 Claims, 5 Drawing Sheets

ELECTRICAL INTERCONNECT FOR A FUEL CELL STACK

RELATED APPLICATIONS

The present invention claims priority from U.S. Provisional Patent Application Ser. No. 60/512,782 filed 21 Oct. 2003 and herein incorporates such document by reference.

FIELD OF THE INVENTION

The present invention relates generally to the electrical connection between fuel cell health management and control systems and fuel cell stacks. More particularly, the present invention relates to an electrical interconnect for use with fuel cell stacks for example polymer electrolyte membrane (PEM) fuel cell stacks.

BACKGROUND OF THE INVENTION

A fuel cell is an energy conversion device that electrochemically reacts a fuel with an oxidant to generate direct current (DC) power. A fuel cell typically consists of an anode, an electrolyte material and a cathode. In a Polymer Electrolyte Membrane (PEM) fuel cell, the anode and the cathode are bonded onto the polymer electrolyte material to form an individual cell. The individual cell generates a relatively small voltage, typically 0.6-0.7 Volts, but may produce high currents. To achieve higher voltages that are practically useful, electrical interconnects are used to connect a relatively large number of individual cells in series. The electrical interconnect also usually provides passageways which allow the flow of fuel to the anode of each cell, oxidant to the cathode and water for cooling and humidification purposes. These electrical interconnects are commonly referred to as "plates".

The term "plates", in the present field, incorporates a number of different types of plates, such as end plates, buss plates, fuel/oxidant plates, fuel/cooling (air or liquid) plates and oxidant/cooling (air or liquid) plates. The buss plates are used to collect current from the active area of a fuel cell, and have an extended conductive tab that allows an electrical connection for supplying a load. Typically, two buss plates, located at each end of the active section of the fuel cell stack, are used in a fuel cell stack. The assembly of fuel cells thus formed is referred to as a fuel cell stack.

A fuel cell power generation system typically comprises a fuel cell stack that consists of a humidification section and an electrochemically active section although some systems are designed such that humidification of the reactants occurs outside of the fuel cell stack. The humidification section imparts water vapour to the hydrogen containing fuel stream and the oxygen containing oxidant stream that are fed into the fuel cell stack. The electrochemically active section comprises fuel cells for promoting the electrocatalytic conversion of the humidified fuel and oxidant streams to electric current and product water. The electrochemically active section also includes a coolant water stream for absorbing heat generated in the active section. The fuel cell system includes a heat exchanger for removing heat from the coolant water stream exiting the active section, a water separator for removing water from the oxidant stream exiting the fuel cell stack, and a coolant reservoir for receiving the removed water stream from the water separator and from the heat exchanger. The coolant water stream is drawn from the coolant reservoir. An example of the design of such an Integrated Fuel Cell Power Generation System is disclosed in U.S. Pat. No. 5,200,278. In other designs, air is used as the coolant instead of water.

The current art of connecting a plurality of individual fuel cells in series to achieve higher voltages leads to the disadvantage that all of the connected fuel cells can be rendered inoperable if one of the fuel cells in the fuel cell stack fails. The probability of failure of a single fuel cell in a stack is not known, but for a given probability of failure, the weakest link theory allows estimation of the probability of failure for a stack that is connected in series. Assume, for example, that a 1 kW stack that consists of 50 fuel cells in series and that each cell has the same probability of failure. If the failure probability for each cell is 0.01 over a specified period, then the probability of survival is 0.99. The probability of having a good stack is then $0.99^{50}$ or about 0.60. The probability of failure over the specified period therefore is about 40%, a very high value. Reliability of fuel cell stacks is a major concern for many applications.

While the fuel used in low temperature fuel cells may be pure hydrogen, commonly an impure hydrogen stream is used as the fuel source. For example, impure hydrogen produced by reforming hydrocarbon or oxygenated hydrocarbons such as natural gas, propane, or methanol may be used. These impure hydrogen streams commonly contain significant amounts of electrocatalyst poisons such as carbon monoxide, which seriously degrade the power output of the fuel cell stack. Similarly, electrocatalyst poisons can be introduced through the oxidant stream, especially when air is used as the oxidant. Poisoning of fuel cell stacks is another major concern for many applications.

In the prior art, the following patents U.S. Pat. Nos. 6,339, 313 and 6,541,941, of the same assignee, disclose a means for alleviating both the reliability and poisoning problems outlined above. It is well known that electrocatalyst poisons can be removed from the anode by periodically raising the anode potential and that electrocatalyst poisons can be removed from the cathode by periodically lowering the cathode potential. For example, carbon monoxide can be removed from a platinum electrocatalyst by raising the anode potential to approximately 700 mV vs. a Reference Hydrogen Electrode (RHE). At this potential the carbon monoxide (CO) is oxidized to carbon dioxide ($CO_2$), which is released into the fuel stream. The same patents also disclose that the same devices and methods can be used to supplement a weak cell or by-pass a defective cell in a stack to thereby increase the overall stack reliability. In order to effect poison removal or cell supplementation or by-pass, very large currents which may be equal to or even exceed the maximum stack current must be introduced into the edge of the cell plates and this current must then flow in the plane of the plate to be equally distributed over the surface of the individual cell that is being treated.

Presently, the fuel cell plates utilized in PEM fuel cells are commonly made of machined graphite, moulded composite graphite/plastic materials or an inexpensive, flexible sheet material (such as Grafoil™) into which reactant flow fields are pressed. These materials have the advantage that they are chemically stable in the harsh operating environment encountered in a PEM fuel cell and they have a sufficiently high electrical conductivity such that the voltage drop caused by the flow of the stack current through the thin plate (i.e., normal to the plate surface) is sufficiently small.

Figure 1:
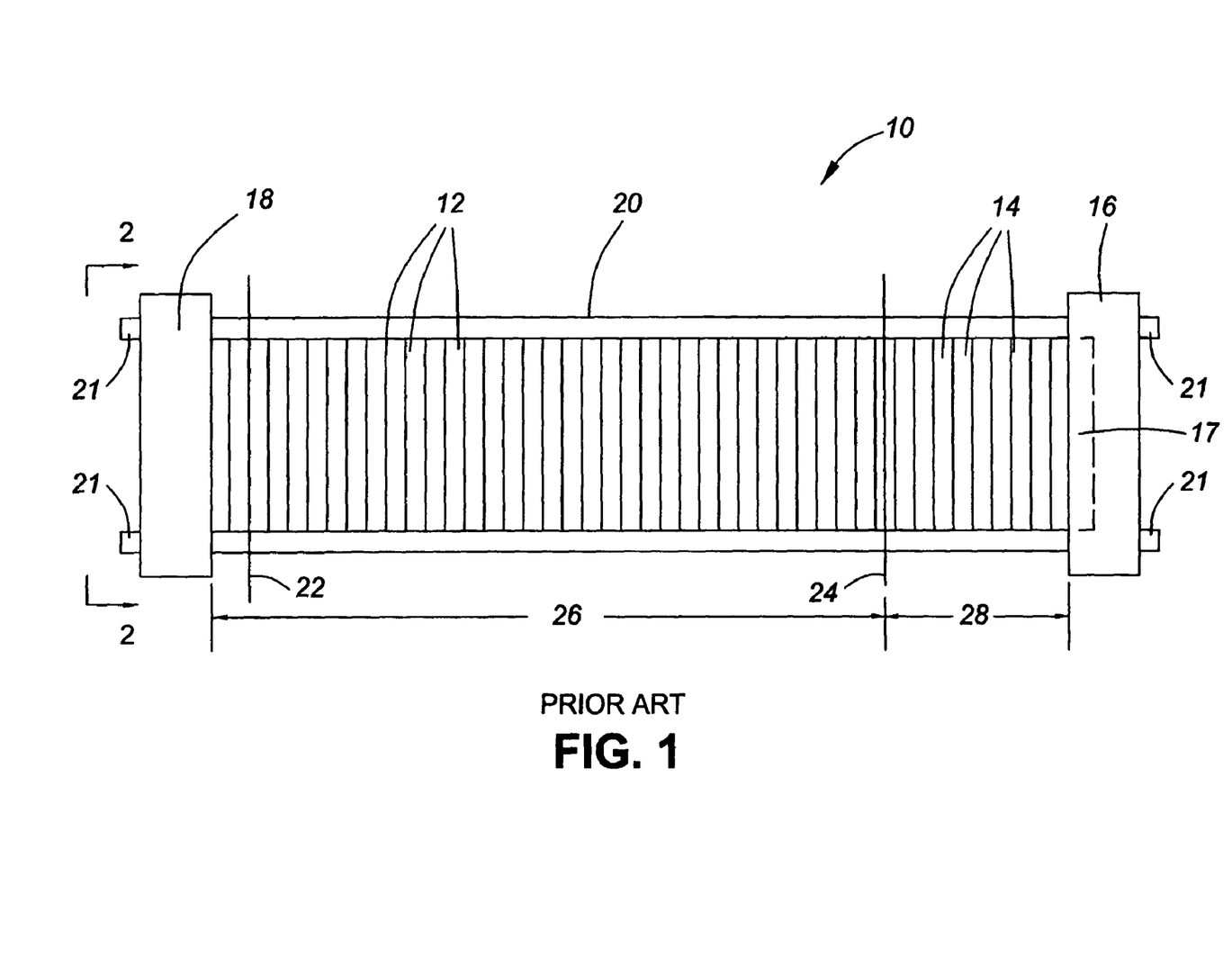
FIG. 1 is a side elevation view of a fuel cell stack assembly of the prior art showing both the electrochemically active and humidification sections

In FIG. 1 of the prior art, a fuel cell stack assembly 10 is shown. The fuel cell stack assembly 10 includes an electrochemically active section 26 and a humidification section 28. The stack assembly 10 is a modular plate and frame design, and includes a compression end plate 16 and a fluid end plate 18. An optional pneumatic piston 17, positioned within compression end plate 16, applies uniform pressure to the assembly to promote sealing. Buss plates 22 and 24 located on opposite ends of active section 26 provide the negative and positive contacts, respectively, to draw current generated by the fuel cell stack assembly 10 to a load (not shown). Tie rods 20 extend between end plates 16 and 18 to retain and secure stack assembly 10 in its assembled state with fastening nuts 21.

The active section 26 includes, in addition to buss plates 22 and 24, a plurality of fuel cell assemblies 12, each assembly consisting of two fuel cells. The humidification section 28 includes a plurality of humidification assemblies 14, each assembly consisting of a fuel or oxidant reactant flow field plate, a water flow field plate and a water vapor transport membrane interposed between the reactant flow field plate and the water flow field plate. The humidification section 28 imparts water vapor to the fuel and oxidant streams that are later fed to the active section 26, thereby preventing the membranes within the active section from drying out.

Figure 2:
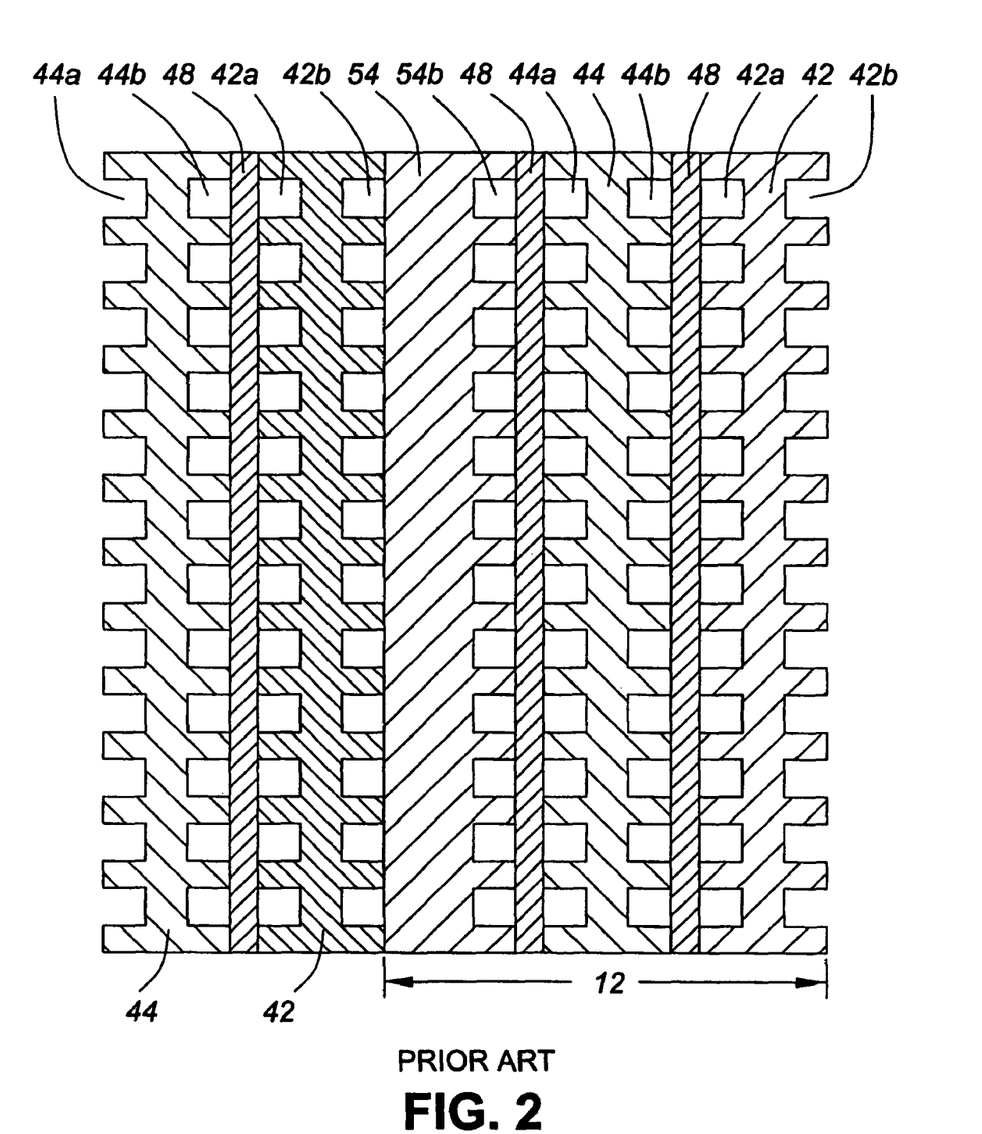
FIG. 2 is a sectional view of the fuel cell stack assembly in the active section of the prior art FIG. 1.

FIG. 2, of the prior art, is a sectional view of the fuel cell assemblies 12, which constitute the electrochemically active section of fuel cell stack assembly 10 of FIG. 1. In particular, assembly 12 includes graphite flow field plates 42, 44 and 54. Fuel flow field channels 54b and 44b are engraved or milled into plates 44 and 54 respectively as shown. Oxidant flow field channels 42a and 44a are engraved or milled into plates 42 and 44, respectively, as shown. Water flow field channels 42b are engraved or milled into plate 42 on the side opposite channels 42a, as shown. The membrane electrode assemblies 48 are interposed between fuel flow field channels 44b and oxidant flow field channels 42a and between fuel flow field channels 54b and oxidant flow field channels 44a.

Membrane electrode assemblies 48 are essentially identical. Each membrane electrode assembly 48 comprises two layers of porous electrically conductive sheet material, preferably carbon fiber paper, and a solid polymer electrolyte or ion exchange membrane interposed between the two layers of porous electrically conductive sheet material. The sheet material layers are each coated with catalyst, preferably finely divided platinum, on the surfaces adjacent and in contact with the ion exchange membrane to render the sheet material electrochemically active. The two electrodes and ion exchange membrane are heat and pressure consolidated to form membrane electrode assemblies 48.

The existing fuel cell plate designs have electrical and/or physical deficiencies that make connection of the Fuel Cell Health Manager (FCHM) systems disclosed in U.S. Pat. Nos. 6,339,313 and 6,541,941, difficult or impossible. The electrical conductivity of pure graphite is relatively low being of the order of $800 \times 10^{-6}$/ohm-cm and that of moulded graphite/plastic plates or Grafoil™ several times lower than pure graphite. With typical electrode currents in PEM fuel cell stacks being of the order of 1 A/cm², it can easily be shown that unacceptably large voltage drops (several hundreds of mV) will occur when currents are introduced into the edge of the plates in high power stacks. Such large voltage drops will result in uneven distribution of current through the plates and ineffective removal of fuel cell poisons. Existing fuel cell plates also fail to provide the extensions that are needed for electrical connection of the FCHM to the stack and for heat removal from high power FCHM electronic components such as Metal Oxide Field Effect Transistors (MOSFETs).

In view of the above-noted shortcomings, it is therefore desirable to provide an improved electrical interconnect for use in a fuel cell stack which is highly conductive and chemically durable, and suitable for use with a management and control tool such as the FCHM. Furthermore, there is a need for an improved apparatus and method for electrically connecting the FCHM and control systems to fuel cell stacks. In particular, there is a need for an electrical interconnect that has high electrical conductivity so that there is an acceptable level of voltage drop across the plate during poison removal, also termed rejuvenation, and/or cell supplementation and by-pass, that is also chemically stable in the fuel cell operating environment and that can be used as a heat sink or have a heat sink attached for the high power electronic components associated with the FCHM system. In addition, there is a need for an apparatus and method that maintains the benefit of reduced overall size to maintain a high overall power density of the fuel cell system.

SUMMARY OF THE INVENTION

It is an object of the present invention to obviate or mitigate at least one disadvantage of previous electrical interconnects.

The present invention provides an electrical interconnect for use in a fuel cell stack. The present invention further provides a fuel cell assembly, for use in the electrochemically active section of a fuel cell stack, comprising one or more membrane electrode assemblies (MEA), each disposed between two flow field plates that distribute fuel and oxidant to the anode and the cathode, an additional flow field plate for passing coolant in order to cool the assembly and, possibly, a buss plate. At least one of these plates is an electrical interconnect of the present invention. According to the present invention, the electrical interconnect is constructed to include one or more electrically conductive tabs, where one or more of the tabs are in turn coupled to a Fuel Cell Health Manager (FCHM). The FCHM is able to monitor, control, rejuvenate, supplement, and bypass the fuel cell assembly through the connection made via the tabs.

The tabs may also be utilized as mounts and heat sinks for high power electronic components associated with the FCHM, the heat generated by these FCHM components being dissipated by the fuel cell stack cooling system. At least one of these plates is an electrical interconnect of the present invention. According to the present invention, the electrical interconnect is constructed in the form of one or more electrically conductive tabs. The terms "interconnect" and "tab" are interchangeable. The tabs may be formed separately from or integrally with plates of the fuel cell stack. If the tabs are integrated into a plate of the fuel cell stack, then the entire plate with associated tab would be considered the interconnect. The tabs are capable of being coupled to a Fuel Cell Health Manager (FCHM). The FCHM is able to monitor, control, and rejuvenate the fuel cell assembly though the connection made via the tabs.

The electrical interconnects are made from a highly electrically conductive material such that the voltage drop across each plate member provided by an FCHM is small thus allowing the current density across the MEA to be essentially uniform. The material of the electrical interconnects is advantageously selected based on its electrical and thermal conductivities and its chemical stability in the operating environment of the fuel cell. The tabs enable a variable output voltage of the fuel cell stack. This could occur by varying the connection across the one or more tabs. For example, the voltage across one end of the fuel cell stack and any given tab located within the stack could be 24V. By varying tabs within the depth of the fuel cell stack, the output voltage could be varied accordingly.

The tabs may also be used for heat sinks for high power electronic components associated with the FCHM. The heat generated by these FCHM components begin dissipated by the fuel cell stack cooling system. Moreover, the tab itself may be dimensioned in a manner that would allow for dissipation of excess heat. In other words, the tab itself would also function as a heat sink.

The interconnects are made from a highly electrically conductive material such that the voltage drop across each plate member provided by an FCHM is small, thus allowing the current density across the MEA to be essentially uniform. The material of each interconnect is advantageously selected based on its electrical and thermal conductivities and its chemical stability in the operating environment of the fuel cell. A significant benefit of the present invention is that the inventive interconnect creates a more uniform voltage over the plate area due to enhanced conductivity. This, in turn, improves fuel cell stack performance and life.

In a first aspect, the present invention provides an electrical interconnect for use with at least one fuel cell assembly and an FCHM or similar device, the FCHM for monitor, control, rejuvenate, supplement, and bypass actions on the at least one fuel cell assembly, each of the at least one fuel cell assembly having a membrane electrode assembly (MEA) with an electrolyte membrane disposed between an anode and a cathode, and further having corresponding flow field plates alongside the anode and the cathode, the electrical interconnect comprising: a plate member being made of highly electrically conductive material such that the voltage drop across each plate member, provided by the FCHM, provides for a uniform current density across the MEA, the plate member being of suitable thermal conductivity and chemical stability for use with the at least one fuel cell assembly, and the plate member being disposed along one of the corresponding flow field plates; and at least one tab having suitable electrical conductivity to enable sufficient current to flow from the FCHM, and the at least one tab dimensioned for operatively connecting the plate member to the FCHM.

In a second aspect, a electrical interconnect for use with at least one fuel cell assembly and an FCHM or similar device, the FCHM for monitor, control, rejuvenate, supplement, and bypass actions on the at least one fuel cell assembly, each of the at least one fuel cell assembly having a membrane electrode assembly (MEA) with an electrolyte membrane disposed between an anode and a cathode, and further having corresponding flow field plates alongside the anode and the cathode, the electrical interconnect comprising: a plate member being made of highly electrically conductive material such that the voltage drop across each plate member, provided by the FCHM, provides for a uniform current density across the MEA, the plate member being of suitable thermal conductivity and chemical stability for use with the at least one fuel cell assembly, and the plate member forming one of the corresponding flow field plates; and at least one tab having suitable electrical conductivity to enable sufficient current to flow from the FCHM, and the at least one tab dimensioned for operatively connecting the plate member to the FCHM.

In a third aspect, the present invention provides a fuel cell assembly for use in a fuel cell stack with an FCHM or similar device, the fuel cell assembly comprising: a fuel cell assembly, each of the at least of two fuel cells having an electrolyte membrane disposed between an anode and a cathode respectively; a first flow field plate being disposed along a first side of the fuel cell; a second flow field plate being made of high electrically conductive material and for forming an electrical interconnect, the second flow field plate being disposed along a second side of the fuel cell and providing channels for fluid flow within the fuel cell assembly, and the second flow field forming at least one flow field in a surface portion of the second flow field plate to allow for the distribution of the fluid flow to the fuel cell; and a tab being made of electrically conductive material, for electrically connecting the second flow field plate to the FCHM.

In a fourth aspect, the present invention provides a fuel cell assembly for use in a fuel cell stack with an FCHM or similar device, the fuel cell assembly comprising: at least one membrane electrode assembly (MIA), each of the at least one MEA having an electrolyte membrane disposed between an anode and a cathode respectively; a first flow field plate being disposed along a first side of the fuel cell; a second flow field being disposed along a second side of the fuel cell; a plate member being made of highly electrically conductive material such that the voltage drop across each plate member, provided by the FCHM, provides for a uniform current density across the MEA, the plate member being of suitable thermal conductivity and chemical stability for use with the at least one MEA, and the plate member being disposed along the second flow field plate; and a tab being made of electrically conductive material, for electrically connecting the plate to the FCHM.

In a fifth aspect, the present invention provides a plate for use in a fuel cell stack. The plate includes a tab for conducting current uniformly across the plate. The tab may be separate from or integral with the plate. The tab is also dimensioned such that heat transfer is enabled to increase heat dissipation from the plate.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Generally, the present invention provides an improved interconnect for fuel cell stacks. The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Figure 3:
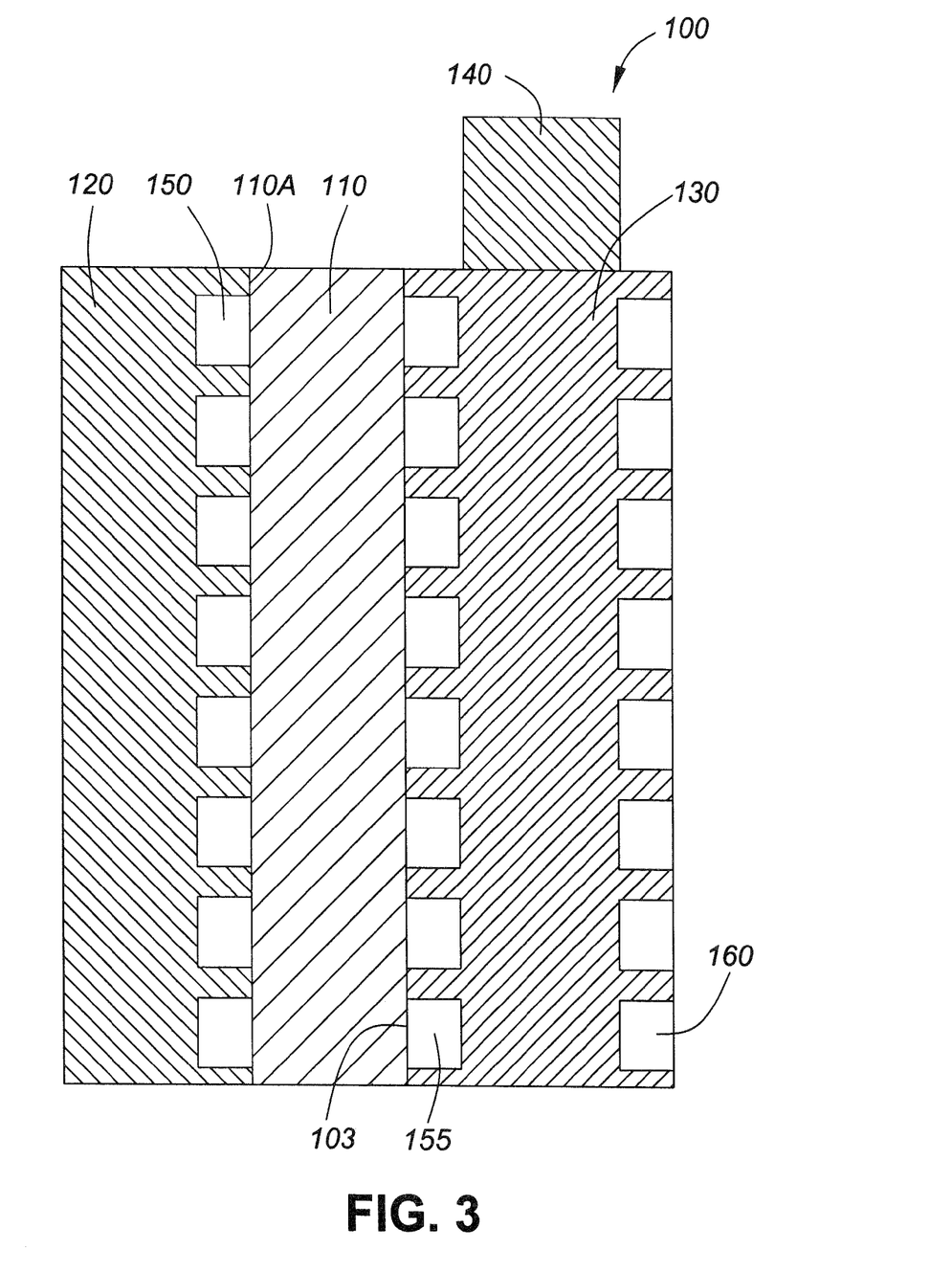
FIG. 3 is a sectional view of a fuel cell assembly having an electrical interconnect according to a first embodiment of the present invention.

Referring now to FIG. 3, a fuel cell assembly 100 in accordance with the present invention is shown. The fuel cell assembly 100 comprises a typical PEM fuel cell 110, a first flow field plate 120, and a second flow field plate 130 forming an electrical interconnect of the present invention, and a tab 140 which is an integral extension of plate 130. The first flow field plate 120 is disposed along an anode side 110A of the fuel cell 110. To provide fuel flow to the anode (not clearly shown) of the fuel cell 110, fuel flow field channels 150 have been milled into the first flow field plate 120. The second flow field plate 130 is disposed along a cathode side 110B of the fuel cell 110. To provide oxidant flow to the cathode (not shown) of the fuel cell 110, the second flow field plate 130 provides oxidant flow field channels 155. The second flow field plate 130 is also constructed with coolant flow field channels 160.

According to the present invention, the second flow field plate 130 is made of a highly electrically conductive material.

The material of the plate member may also be selected based on its thermal conductivity and chemically stability in the operating environment of the fuel cell.

It should be further mentioned that the tab 140 may be utilized for electrically connecting an FCHM (not shown) to the fuel cell assembly 100 for monitor, control, rejuvenate, supplement, and bypass purposes, as described in prior art patents U.S. Pat. Nos. 6,339,313 and 6,541,941, incorporated herein by reference. While an FCHM is mentioned specifically herein, it should be readily understood that any fuel cell device that monitors, controls, rejuvenates, or otherwise electrically manages one or more fuel cells via electronic circuitry may also benefit from the present inventive interconnect without straying from the intended scope of the present invention. The tab 140 also provides a means for coupling a heat sink to the fuel cell assembly 100 for dissipating heat from the FCHM during the monitor, control, rejuvenate, supplement, and bypass processes.

Figure 4:
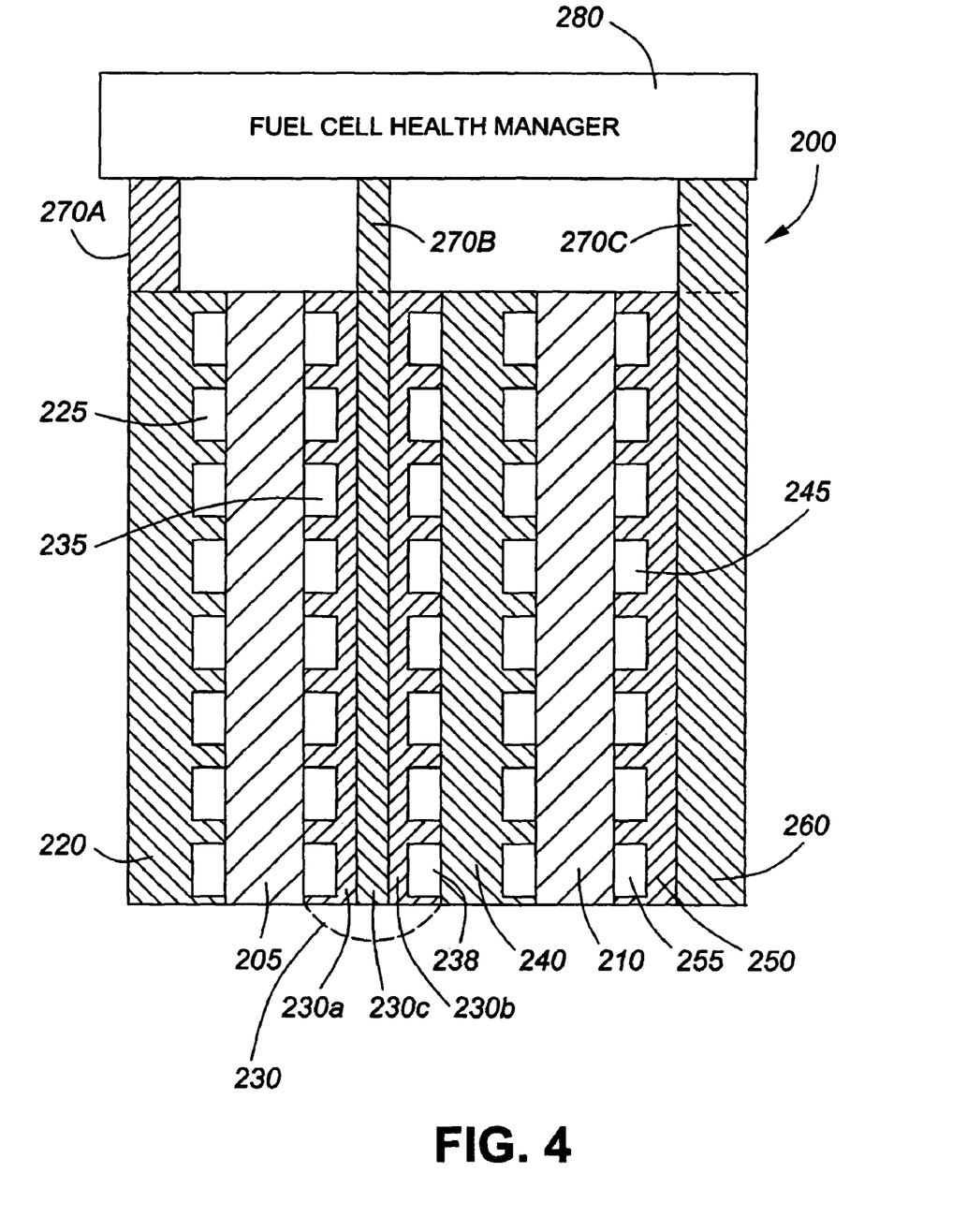
FIG. 4 is a sectional view of two fuel cell assemblies disposed between electrical interconnects for operative use with an FCHM according to a second embodiment of the present invention.

FIG. 4 illustrates a sectional view of a group of fuel cell assemblies 200 according to a second embodiment of the present invention. The group 200 includes two fuel cells 205, 210, disposed between flow field plates 220, 230, 240, 250, where particular flow field plates also form electrical interconnects 220, 230, in accordance with the present invention and where a further electrical interconnect 260 of the present invention is also included. The flow field plates 220, 230, 240, 250 each provide one or more layers of flow field channels 225, 230, 235, 238, 245, 255, respectively. The first flow field plate 220 provides a set of flow field channels 225. This set of flow field channels 225 may either stream fuel or oxidant to the first fuel cell 205 depending on whether the first flow field plate 220 is disposed along the anode or cathode side of the first fuel cell 205. The second flow field plate 230 is constructed to provide two flow field channels 235, 238, where a first set of flow field channels 235 stream fuel or oxidant depending on the arrangement of the fuel cell 205. The second set of flow field channels 238 is utilized for coolant flow. The third flow field plate 240 is disposed along a first side the second fuel cell 210. The third flow field plate 240 provides a set of channels 245 similar to that of the first flow field plate 220. The fourth flow field plate 250 is disposed along an opposing side of the second fuel cell 210. The fourth flow field plate 250 also provides a set of channels 255 for fuel or oxidant flow depending on the arrangement of the second fuel cell 210. Finally, there is a further electrical interconnect 260 of the present invention disposed along the flow field plate 250.

The electrical interconnects 220, 230, 260, are made of material that is highly electrically conductive, such as a metal or a graphite/metal composite structure. More particularly, the electrical interconnect 230 is a composite structure containing two flow field plates 230*a*, 230*b*, where a highly conductive metal plate 230*c* is disposed between the two flow field plates 230*a*, 230*b*. The flow field plates 230*a*, 230*b* may be made of a graphite material, whereas the metal plate 230*c* may be made of a highly conductive material, such as steel. The materials of the flow field plates and electrical interconnects 220, 230, 240, 250, 260 may be further selected based on their thermal conductivity and chemically stability in the operating environment of the two fuel cells 205, 210, respectively.

As shown in FIG. 4, the electrical interconnects 220, 230, 260 are either further coupled to a tab 270A, or have integrated tabs 270B, 270C, respectively. The tabs 270A, 270B, 270C are connected to an FCHM 280 for monitor, control, rejuvenate, supplement, and bypass processes on the group of fuel cell assemblies 200.

The tabs 270A, 270B, 270C vary in width along the connection side of the electrical interconnects 220, 230, 260, respectively, to enable a suitable electrical connection of the FCHM to the group of fuel cell assemblies 200. Also, depending on the dimension of the tabs 270A, 270B, 270C, the tabs 270A, 270B, 270C may form an integrated heat sink or have an external heat sink (as shown in FIG. 5) mounted thereon to extract heat from high power electronic components (not shown) of the FCHM 280.

Figure 5:
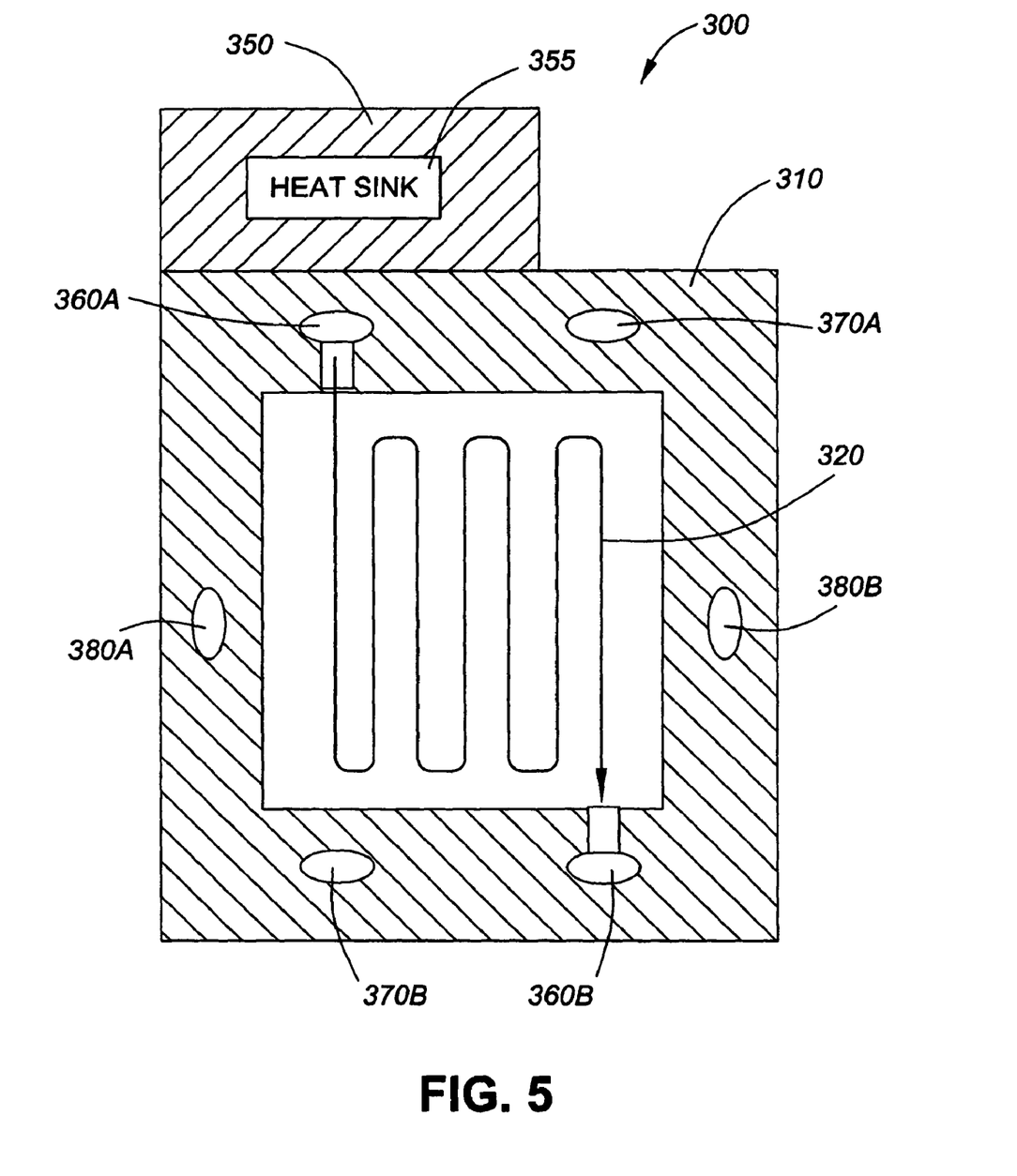
FIG. 5 is a sectional view of an electrical interconnect according to a third embodiment of the present invention.

FIG. 5 illustrates a sectional view of an electrical interconnect 300 according to a third embodiment of the present invention. The electrical interconnect 300 is similar the electrical interconnect 230 of FIG. 4 where the electrical interconnect 300 could be arranged in a group of fuel cell assemblies as is electrical interconnect 230 in FIG. 4. In FIG. 5, this sectional view shows an oxidant flow field 320 on the oxidant distribution side of the plate 310. The oxidant flow field 320 is formed in the surface of the plate to allow for distribution of oxidant to the cathode and for removal of product water produced by the operation of the particular fuel cell. The serpentine flow pattern of the oxidant flow field 320 is known in the prior art and will not be further elaborated upon in this document.

The electrical interconnect 300 is made from a highly electrically conductive material such that the voltage drop across each plate member, provided by the current from an FCHM, is small. In addition, the material of the plate 310 is advantageously selected based on its thermal conductivity and its chemical stability in the operating environment of the fuel cell. The electrical interconnect 300 also provides a tab 350 that allows for electrical connection to an FCHM (as shown in FIG. 4). While the tab 350 is shown a separate element, the tab may be an integrated extension of the plate 310. The tab 350 may also be utilized as a heat sink where the heat is extracted from the FCHM components by relying on cooling provided by the coolant flow field plate in the fuel cell assembly. The tab 350 may also be constructed for mounting thereon a heat sink 355, suitable for any high power FCHM components.

As shown in FIG. 5, the plate 310 is also provided with ports for the distribution of oxidant to the cathodes of all of the fuel cells in the stack. The oxidant channel ports 360*a*, 360*b* are shown as being connected to the oxidant flow field 320 for oxidant flowing, respectively, in and out of the fuel cell, and in turn through the rest of the fuel cell stack assembly. The plate 310 is also constructed to have fuel fluid flow channels, as well as coolant flow channels. FIG. 5 shows a sectional view of the fuel fluid flow channels 370*a*, 370*b* and coolant flow channels 380*a*, 380*b*.

According to the present invention, the plate forming the electrical interconnect of the present invention may be constructed from a metallic material having high conductivity, such as steel or stainless steel, with a corrosion resistant but electrically conductive and chemically durable coating. The electrical interconnect of the present invention may also be constructed from a thin metallic plate or metallic mesh of a highly conductive material such as aluminium which can be used to conduct the FCHM currents to which has been bonded a conductive carbon based plastic material to improve corrosion resistance. A corrosion resistant metal, such as titanium or niobium, which has been coated with platinum or gold to reduce the build-up of resistive oxides at the plate member surface, may also be suitable. The plate can be further inserted into heat removal or humidification sections of a fuel cell stack.

It should be understood that a fuel cell stack with a small number of cells may have interconnects that allow each cell to be treated by the FCHM, whereas in a large stack interconnects may be placed to treat groups of cells. A manner in which this may be accomplished is to have several fuel cells in each assembly and one interconnect, perhaps located in the cooling section, within each assembly. Alternatively, there may be an interconnect for every several assemblies. Accordingly, the electrical interconnect of the present invention can be coupled to an individual fuel cell assembly or a group of fuel cell assemblies. A fuel cell stack with a small number of fuel cells, i.e., less than 20, will likely have an electrical interconnect provided for every fuel cell in the stack. In a small fuel cell stack, electrical interconnects are installed at the anode and cathode side of each fuel cell in a stack. Thus, adjacent cells may share an electrical interconnect where the shared electrical interconnect is disposed along the anode side of a first fuel cell and the cathode side of the adjacent fuel cell. To reduce cost, a fuel cell stack with many fuel cells would likely have electrical interconnects to allow regeneration of groups of two fuel cells or more. Typically, there are 2 to 10 fuel cells per fuel cell assembly in a large fuel cell stack. Also, there may be a coolant flow field plate adjacent every fuel cell assembly in a fuel cell stack to provide a cooling section. However, the number of cooling sections may vary, where for example, several fuel cell assemblies share one cooling section.

It is also understood that flow field plates in a fuel cell assembly can be converted into electrical interconnects, or have a suitable buss plate disposed along a given flow field plate in a fuel cell assembly to provide an electrical interconnect in the fuel cell assembly. It should be mentioned that electrical interconnects of the present invention can be provided throughout a fuel cell stack, where either flow field plates already provided in the fuel cell stack are converted into electrical interconnects, or buss plates are inserted throughout the fuel cell stack. Again, groups of fuel cell assemblies, in a fuel cell stack, can share a single electrical interconnect. The present invention is not limited to the number of fuel cell assemblies, in a fuel cell stack, which could share an electrical interconnect.

The electrical interconnect of the present invention can be provided in humidification and heat removal sections of a fuel cell stack, such as the prior art fuel cell stack 10 of FIG. 1, to cool the FCHM. As mentioned previously, the electrical interconnects installed in proximity of the fuel cell stack coolant flow field plates will assist in cooling of the high powered electronic components mounted on them. A typical PEM fuel cell stack runs at a temperature of $80^C$ and the typical maximum case temperature of a MOSFET utilized for fuel cell stack rejuvenation is $100^C$. By implementing the electrical interconnect of the present invention, the MOSFET would be cooled by the fuel cell stack. The coolest place for the electrical interconnect would be located beside a coolant flow field plate or within the coolant flow field plate as a single hybrid plate.

The above-described embodiments of the present invention are intended to be examples only. Alterations, modifications and variations may be effected to the particular embodiments by those of skill in the art without departing from the scope of the invention, which is defined solely by the claims appended hereto.

Having thus described the invention, what is claimed as new and secured by Letters Patent is:

1. A fuel cell arrangement comprising:
   a plurality of fuel cells, each fuel cell comprising an electrolyte membrane, an anode and a cathode, the electrolyte membrane being disposed between the anode and the cathode, a first flow field plate adjacent the anode and a second flow field plate adjacent the cathode;
   a fuel cell health management (FCHM) device;
   a plurality of plate members interposed between each of the plurality of fuel cells, each plate member being made of an electrically conductive metallic material and disposed between the first flow field plate and the second flow field plate of adjacent fuel cells to connect the plurality of fuel cells in series, and having an electrically conductive tab; and
   the tab of each of the plurality of plate members being electrically connected to the FCHM to conduct current provided by the FCHM to provide a substantially uniform voltage over each electrically of the plurality of plate members to rejuvenate each fuel cell, to monitor each fuel cell, and to control each fuel cell, and having a heat sink mounted thereon for dissipating heat generated by the FCHM.

2. The fuel cell arrangement as claimed in claim 1, wherein each tab is of variable width along a connecting edge of the plate member for efficient coupling to the FCHM.

3. The fuel cell arrangement as claimed in claim 1, wherein at least one of the fuel cells is located in a humidification section of a fuel cell stack.

4. The fuel cell arrangement as claimed in claim 1, wherein each of the plurality of plate members is disposed along a coolant flow field plate.

5. The fuel cell arrangement as claimed in claim 1, wherein each of the plurality of plate members further includes a conductive carbon based plastic material bonded thereon.

6. The fuel cell arrangement as claimed in claim 1, wherein each plate member is made of a corrosion resistant metal coated with platinum or gold to reduce build-up of resistive oxides along a surface of the plate member, 7. The fuel cell arrangement as claimed in claim 1, wherein each of the plurality of plate members is made of a composite material including graphite and metal.

8. The fuel cell arrangement as claimed in claim 1, wherein the tab of each of the plurality of plate members is an integral extension of the respective plate member.

9. The fuel cell arrangement as claimed in claim 1, wherein each of the second flow field plates further comprises an oxidant flow field channel an oxidant distribution side of each second flow field plate for distribution of oxidant to the cathode of each fuel cell and for removal of product water produced by each fuel cell.

10. The fuel cell arrangement as claimed in claim 9, wherein each of the second flow field plates further comprises oxidant channel ports connected to the oxidant flow field channel.

11. The fuel cell arrangement as claimed in claim 10, wherein each of the first flow field plates further comprises fuel flow field channels.

12. The fuel cell arrangement as claimed in claim 11, wherein each of the second flow field plates further comprises coolant flow field channels.

* * * * *

UNITED STATES PATENT AND TRADEMARK OFFICE
CERTIFICATE OF CORRECTION

| | | |
|---|---|---|
| PATENT NO. | : 7,842,425 B2 | Page 1 of 1 |
| APPLICATION NO. | : 10/968287 | |
| DATED | : November 30, 2010 | |
| INVENTOR(S) | : William A. Adams et al. | |

It is certified that error appears in the above-identified patent and that said Letters Patent is hereby corrected as shown below:

Figure 3, Sheet 3 of 5, delete reference numeral "103" and insert therefor -- 110B --.

Column 10, line 41, claim 9, delete "channel an" and insert therefor -- channel on an --.

Signed and Sealed this

Eighth Day of February, 2011

David J. Kappos
*Director of the United States Patent and Trademark Office*